July 5, 1949.    R. GOUIRAND    2,475,451
TIRE VALVE RETAINING DEVICE
Filed March 29, 1947
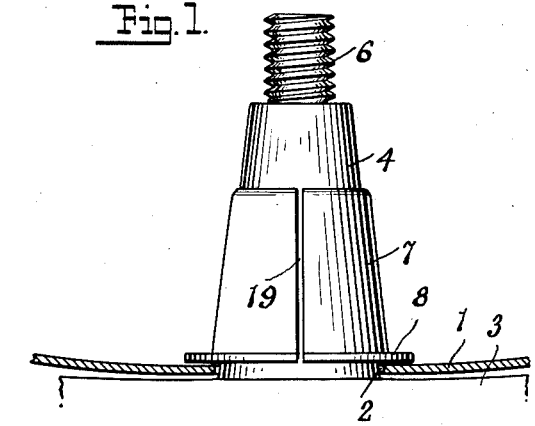
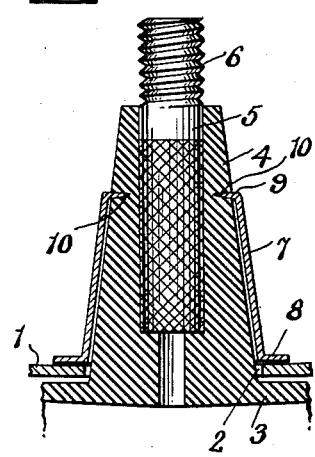
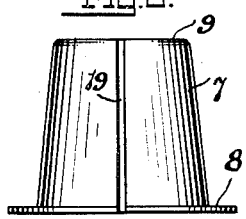
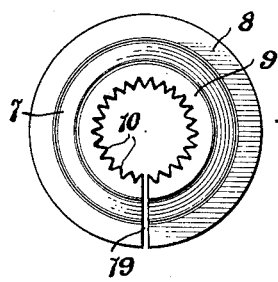
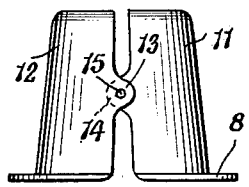
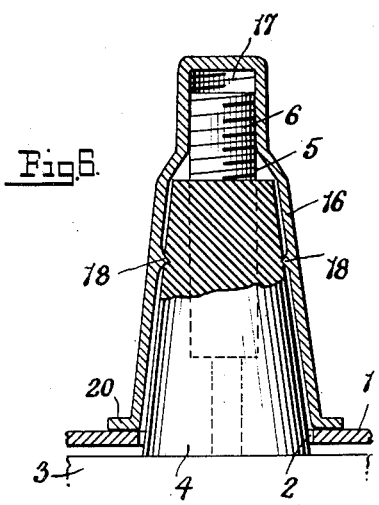
INVENTOR.
Rene Gouirand
BY
Harry Radzinsky
Attorney Patented July 5, 1949

2,475,451

UNITED STATES PATENT OFFICE 2,475,451

TIRE VALVE RETAINING DEVICE

Rene Gouirand, New York, N. Y.

Application March 29, 1947, Serial No. 738,063

8 Claims. (Cl. 152—427)

This invention relates to retaining devices for the valve stems of automobile tires, such retaining devices employed for the purpose of preventing withdrawal of the valve stem and the valve carried thereby, through the hole in the wheel rim and into the tire.

In inner tubes of automobile tires, as constructed at the present time, the stem in which the valve is encased is composed of rubber or synthetic rubber and constitutes an integral extension of the body of the tube. In use, the stem extends outwardly through a hole in the rim of the wheel and is thus exposed on the outside of the wheel so that access to the valve may be had for the purpose of inflating the tire. When a puncture or blow-out occurs while the car is moving, the deflation of the tube usually causes the stem and valve carried by it to be withdrawn through the hole in the rim and pulled within the tire casing. The result is that the metal valve, contained in the tube stem, is compressed between the rim of the wheel and the inside of the tire shoe or casing, the valve thus presenting sharp edges or parts which not only serve to cut or tear the tube to pieces, but also seriously damage the shoe or casing. I have found that by preventing the withdrawal of the tube stem and valve into the shoe, damage to both the tube and shoe can be prevented.

The present invention therefore has reference to a device which is adapted to be fitted on the protruding portion of the soft and compressible valve stem of a tube, and which will hold the stem and prevent it from being drawn into the shoe or casing when a puncture or blow-out of the tube occurs. An object of the invention is to provide a simple, inexpensive device of this character which can be readily fitted in place on the valve stem without the use of tools; which can be in the form of a simple, one-piece stamping and which will effectively hold the valve stem extended through the hole in the wheel rim until it is desired to manually withdraw the same.

In the accompanying drawing, wherein several illustrative embodiments of the invention are shown, Fig. 1 is a side elevational view of a valve stem retaining-device constructed in accordance with the invention; Fig. 2 is a vertical sectional view of the same; Fig. 3 is a side elevational view of the retaining member detached from the valve stem; Fig. 4 is a top plan view of the same; Fig. 5 is a side elevational view of a modified construction, and Fig. 6 is a vertical sectional view of another modification.

With reference to the structure disclosed in Figs. 1 to 4 inclusive, 1 indicates a portion of the rim of a conventional automobile wheel, and on which a tire, consisting of an outer casing or shoe, and an inner tube is received and maintained in the known manner. The rim 1 is provided with a hole or aperture indicated at 2 through which the stem 4, protruding from the inner tube 3, projects to the outside of the rim to be accessible for the inflation of the tire. The stem 4 is of rubber or synthetic rubber and forms an integral extension of the tube 3. Maintained within the stem 4 is the conventional tire valve 5 which is provided with a projecting threaded portion 6 extending beyond the end of the stem 4 and arranged to threadably receive the conventional valve cap. The elements thus far described are known in the art and are widely employed on automobiles at the present time.

With the arrangement shown, and wherein the stem 4 projects through the hole 2 and is maintained in a projected position solely by the inflation of the inner tube 3, it has been found that when the inner tube is suddenly deflated, as by a puncture or blow-out, the stem 4, carrying the metallic valve 6, will be drawn inwardly through the hole 2 to the inside of the tire shoe or casing, and as the wheel revolves, the valve 6 will be compressed between the rim and the tube and shoe and will usually badly tear the tube and very often seriously damage the shoe. I have therefore found that it is very desirable to maintain the stem in its projected position on the outside of the rim at all times and particularly under the circumstances above mentioned, whereby the valve 6 will always be maintained externally of the shoe and in a position where it cannot do harm or damage to the tube or shoe.

One form of retaining device for the purpose above mentioned is shown in Figs. 1 to 4, and indicated at 7, where it will be observed that the same consists of a conical, cup-shaped member, preferably stamped or otherwise formed from springy sheet metal. At the smaller end of the cup 7 is provided an inturned flange 9 having its inner edge formed with a plurality of teeth or serrations, or otherwise roughened, to provide a gripping surface or edge to engage or bite into the soft and compressible material of which the stem 4 is composed. The larger end of the cup 7 is provided with a radial flange 8, and the diameter of the cup, at least at its flanged end, is greater than the hole or aperture 2 in the rim 1. The result is that when the cup 7 is fitted upon the stem, it will act as a retaining means to hold the stem extended through the hole 2 at all times, and particularly during and after a puncture or blow-out, since the cup cannot pass through the hole 2.

To facilitate the placement of the retaining member or cup 7 on the stem 4, the cup is split as indicated at 19, and by the insertion of the blade of a screw-driver or other suitable tool in this split 19, the cup can be expanded to an extent necessary to enable it to be easily fitted over the stem 4 and forced down on the same until the flange 8 comes into contact with the rim. Then when the blade of the screw-driver or other tool is removed from within the split 19, the cup will spring back to shape and the teeth 10 on the flange 9 will bite into the body of the stem 4 and thus serve to securely anchor the device in position on the stem. By inserting the blade of a screw-driver in the split and forcing the same apart, the device can be readily removed at any time.

The device is not only useful for holding the stem through the opening 2 during and after a puncture or blowout, but it is also useful when mounting a tire, since it can be fitted on the stem of the tube directly after the stem has been inserted through the hole 2 and it will hold the stem in such extended position while the shoe is being placed on the rim, an operation which very often causes an unheld stem to slip back within the shoe.

The flange 8, while constituting a means for preventing the retaining device from passing through the hole 2, will also act as a sealing means for the hole 2, acting to prevent the entry of dust and dirt therethrough.

In the embodiment of the invention shown in Fig. 5, the device is composed of a pair of segments 11 and 12, that shown at 11 being provided with the ears 14, while that shown at 12 has ears 13. The ears 13 and 14 are overlapped and held together by the pivot pins 15, the pivots for the two segments 11 and 12 being located diametrically opposite to one another. With this embodiment of the invention, the device may be spread at the top by swinging the two segments on the pivots 15, until the device can be slipped over the stem. When this is done, the parts are squeezed toward one another at the top or narrower end, until the teeth 10, which are provided at the top of the two segments 11 and 12, bite into the soft material of the stem 4 and hold the retaining device thereon.

In the embodiment of the invention shown in Fig. 6, the retaining device 16 is in the form of a valve closure as well as a stem-retaining device. The device 16 is provided with an internally threaded part 17 constituting a valve cap, and which is threaded upon the protruding threaded portion 6 of the valve 5 in the manner shown. A flange 20 is provided at the base of the member 16 and said flange is similar in function to that shown at 8 and previously described. Teeth or other protrusions 18 may be provided on the inside of the member 16 to grip or bite into the soft, compressible material of the stem 4 when the retaining member is screwed into position on the threaded part 6 of the valve.

In use, the device is placed in position on the stem 4 at any time, and this may be usually done without the use of tools, or at most with a simple tool such as a screw-driver, and the device will retain its position indefinitely on the stem. When a puncture or blow-out occurs, the stem will be retained in its protruding position through the hole 2 and thus the valve 5 carried by the stem will be prevented from entering the tire and doing damage to the same.

While I have shown several embodiments of the invention, it is obvious that various modifications may be made to the same, such modifications being considered as within the scope of the claims appended hereto.

What I claim is:

1. In a device of the character described in which a compressible valve stem projects through an aperture in a vehicle wheel rim, a retaining member in the form of a cup fitted over the stem on the outside of the rim and having gripping teeth engaging the stem, said retaining member being larger in diameter than the diameter of the aperture in the rim.

2. A retaining device for valve stems of inner tubes comprising, a conical cup adapted to fit over only that portion of a valve stem which protrudes through the aperture in and is located on the outside of a tire rim, said cup having an inturned flange engaging and gripping the compressible material of which the valve stem is composed, the cup being larger than the aperture through which the stem extends and acting to prevent withdrawal of the stem through said aperture.

3. In a retaining device for the valve stem of a tire inner tube, a split annulus surrounding the stem on the outside of a rim, said annulus having teeth engaging the compressible material of the stem and holding itself thereon, said annulus being wholly located on the outside of the rim and being larger in diameter than the aperture in the rim of the wheel through which the valve stem protrudes.

4. A retaining device for valve stems comprising, a valve stem of rubber or similar compressible material extending through a hole in a vehicle wheel rim, a cup of substantially conical form fitted about the stem and engaging the same on the outside of the rim, teeth at the narrower end of said cup, the wider end of the cup being disposed against the outside face of the rim and being of greater diameter than the hole through which the stem extends, the engagement of the stem by the cup thereby preventing the stem from being drawn through the hole to the inside of the rim.

5. A retaining device for tire valve stems comprising, a valve stem of compressible material extending through a hole in a wheel rim, a conical cup fitted around said stem on the outside of the rim, said cup having an aperture in its smaller end through which the stem extends, the edge of said aperture being serrated to cause it to bite into the material of the stem and thereby attach the cup to the stem, the cup having its wider end located adjacent to the base of the stem and operative against the rim through which the stem extends, the cup being incapable of passing through the hole in the rim through which the stem extends.

6. A retaining device as provided for in claim 5, wherein the cup is split so that it may be expanded to facilitate it being placed on and removed from the valve stem.

7. A device of the character described comprising, an inner tube having a soft valve stem projecting through a hole in a vehicle wheel rim, a ring fitted on the stem and wholly disposed on the outside of the vehicle wheel rim, said ring being provided with inwardly-directed teeth biting into and gripping the soft valve stem and preventing the stem from being drawn through the hole when a puncture takes place in the tube.

8. A device of the character described comprising, an inner tube having a soft valve stem projecting through a hole in a vehicle rim, a ring fitted on the stem and wholly disposed on the outside of the vehicle wheel rim, said ring being formed with inwardly-directed teeth by which it bites into and grips the soft valve stem, and a flange at the end of the ring disposed outside of the rim and of a diameter larger than the diameter of the hole in the wheel rim.

RENE GOUIRAND.

REFERENCES CITED

The following references are of record in the file of this patent:

UNITED STATES PATENTS

| Number | Name | Date |
|---|---|---|
| 2,064,695 | Sipe | Dec. 15, 1936 |
| 2,106,638 | Hillier | Jan. 25, 1938 |
| 2,123,524 | Colley | July 12, 1938 |
| 2,192,572 | Bourdon | Mar. 5, 1940 |
| 2,276,502 | McCoy | Mar. 17, 1942 |
| 2,300,498 | Goff | Nov. 3, 1942 |